United States Patent [19]

Kikuchi et al.

[11] Patent Number: 4,698,005

[45] Date of Patent: Oct. 6, 1987

[54] SEALING APPARATUS

[75] Inventors: Uhee Kikuchi; Hiroyoshi Nozaki, both of Sayama; Masao Fukuda, Hidakamachi; Toshihiko Satake, Fuchu, all of Japan

[73] Assignee: Honda Giken Kogyo Kabushiki Kaisha, Tokyo, Japan

[21] Appl. No.: 680,130

[22] Filed: Dec. 10, 1984

[30] Foreign Application Priority Data

Oct. 3, 1984 [JP] Japan ............................... 59-149055

[51] Int. Cl.$^4$ ............................................ B29C 69/02

[52] U.S. Cl. .................................. 425/163; 118/206; 118/410; 118/697; 401/286; 401/288; 425/375; 901/43

[58] Field of Search .................... 15/29; 118/206, 697, 118/698, 410, 308, 427; 425/87, 106, 472, 375, 163; 401/286, 288; 901/30, 43

[56] References Cited

U.S. PATENT DOCUMENTS

| | | | |
|---|---|---|---|
| 949,727 | 2/1910 | Farrington | 15/29 |
| 2,806,236 | 9/1957 | DiStefano | 118/206 |
| 3,084,069 | 4/1963 | Simon | 15/29 |
| 3,638,264 | 2/1972 | Walton | 15/29 |
| 3,943,591 | 3/1976 | Lanusse | 15/29 |
| 4,239,431 | 12/1980 | Dauini | 118/697 |
| 4,327,454 | 5/1982 | Spence | 15/29 |
| 4,498,414 | 2/1985 | Kiba et al. | 118/697 |
| 4,531,250 | 7/1985 | Watanabe | 15/29 |
| 4,539,932 | 9/1985 | Vecellio | 118/697 |
| 4,546,724 | 10/1985 | Kiru et al. | 118/697 |
| 4,605,569 | 8/1986 | Shimada et al. | 118/697 |

FOREIGN PATENT DOCUMENTS 55-81759 6/1980 Japan .

*Primary Examiner*—Willard E. Hoag
*Attorney, Agent, or Firm*—Armstrong, Nikaido, Marmelstein & Kubovcik

[57] ABSTRACT

A sealing apparatus wherein the nozzle on the forward end portion of a sealing gun on a programmable industrial robot includes a nozzle holder and a nozzle body made of a flexible material. The forward inner end of the nozzle body can gradually diverge and a reinforcement pipe can be provided in the nozzle holder. The nozzle body can be in the form of a tubular brush made of nylon bristles, a solid tubular body of polyurethane foam or a solid tubular body of silicone rubber.

5 Claims, 9 Drawing Figures

SEALING APPARATUS

BACKGROUND OF THE INVENTION

This invention relates to an apparatus for automatically applying and at the same time pressing a sealing agent to be filled into a joint portion of abutted panels or the like, that is, a joint between abutted panels or the like connected together by spot welding or the like for making a motorcar body, for instance.

It has been usual hitherto that a sealing operation for given air-tightness and liquid-tightness to a joint of abutted panels or the like is carried out manually by using a sealing gun. A forward end portion of a nozzle of the sealing gun is moved along on the joint while being kept in contact with the joint. During this movement a sealing agent is delivered from the nozzle for being applied thereto. Thereafter the applied sealing agent is pushed to be filled into the joint by spreading the same with a brush or trowel. This manual sealing operation, however, is inconvenient in that it is necessary for a worker to work in an unnatural posture in some occasions because of the shape of the car body or the place of a portion to be sealed. Further, it requires a great deal of skill to apply and fill the sealing agent uniformly and accurately. It is necessary to take two steps, that is, a step for applying the sealing agent and a step for filling the same, so that a workability is lowered.

For removing this inconvenience and automating the sealing operation, a sealing apparatus has been developed which comprises an industrial robot having a sealing gun. A nozzle provided on a forward end portion of the sealing gun may be moved along on a portion to be sealed in accordance with a locus of a program previously memorized by the robot. This sealing apparatus, however, has the disadvantages in that, on sealing a portion, for instance, of a joint of panels connected together by spot welding or the like for making a motorcar body, a good sealing is difficult to achieve, and the surface of the workpiece is liable to be injured by the nozzle by contact of the nozzle during its movement. Further, because of a dispersion in joints of panels, unreliable correction by handwork at the time of motorcar body assembling, an error in accuracy in motorcar body positioning, or an error in accuracy in the robot at the time of teaching or the like, it often happens that the moving nozzle deviates from the joint to be sealed. Similarly to the foregoing manually handled sealing gun, it is impossible to effect simultaneously the step for applying the sealing agent of the joint and the step for filling or pressing same therein.

OBJECTS AND SUMMARY OF THE INVENTION

This invention has for its object to provide a sealing apparatus whereby the foregoing inconveniences can be removed, and a good sealing can be carried out even if there is a certain extent of a deviation of the nozzle from the portion to be sealed. In addition, the step for applying the sealing agent to the portion and the step for filling the same therein can be carried out simultaneously.

The invention resides in an apparatus including an industrial robot having a sealing gun and is arranged with a nozzle provided on a forward end portion of the sealing gun which may be moved along on a portion to be sealed in accordance with a locus of a program previously memorized. The invention is characterized in that the nozzle is composed of a nozzle holder constituting a base portion thereof and a nozzle body of a flexible material connected to the nozzle holder.

DETAILED DESCRIPTION OF PREFERRED EMBODIMENTS

Figure 1:
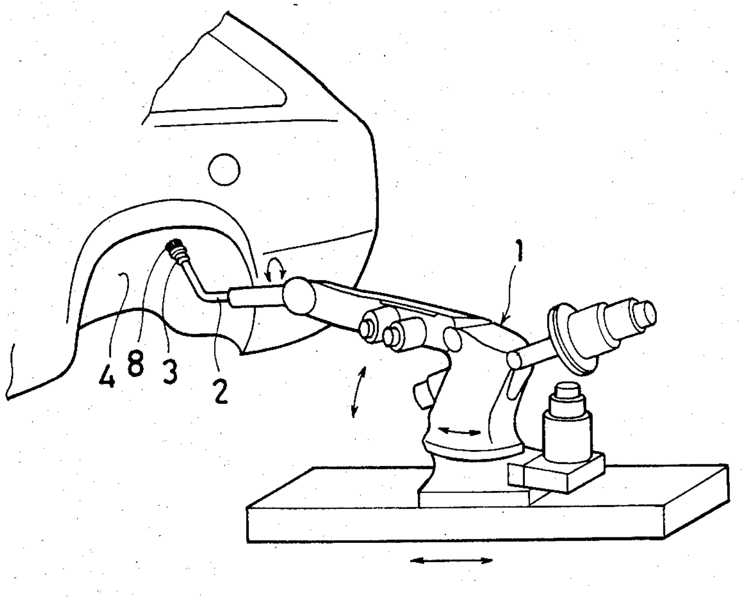
FIG. 1 is a prespective view of one example of this invention.
Figure 2:
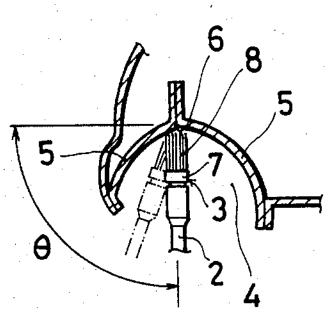
FIG. 2 is an explanation diagram showing contact of a nozzle of the invention with a portion to be sealed.

Embodying examples of this invention will be explained with reference to the accompanying drawings:

Referring to FIG. 1, an industrial robot has a sealing gun 2 attached thereto. The sealing gun 2 is provided, at its forward end portion, with a nozzle 3. When the industrial robot 1 is slidably moved and is turned in the directions of the arrows (FIG. 1) by a control circuit (not illustrated), the nozzle 3 may be moved, as shown in FIG. 2, for instance, along on a portion 6 to be sealed such as a joining of panels 5, 5 defining a rear wheel housing 4 of a motorcar body, for instance.

According to the characteristic feature of this invention, the nozzle 3 is composed of a nozzle holder 7 constituting a base portion thereof and a nozzle body 8 made of a flexible material connected to the nozzle holder 7.

Figure 3:
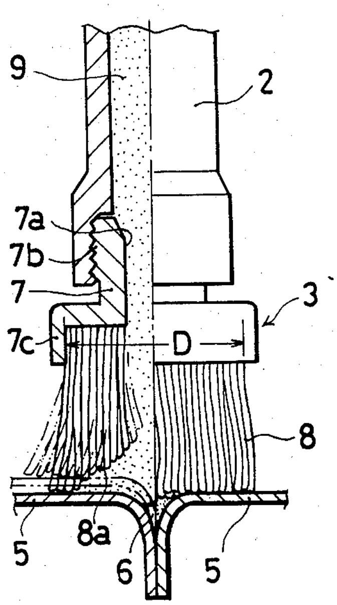
FIG. 3 is a half-sectional side view of an important portion thereof.

As shown clearly in FIG. 3, the nozzle holder 7 is formed to be a tubular having a central communication opening **7*a* for passing a sealing agent 9 supplied under pressure through gun 2 to the nozzle body 8. The holder 7 is provided at its base end portion with a mounting portion 7*b* for the gun 2 and at its forward end portion with a flange 7*c* for mounting the nozzle body 8**.

Figure 4:
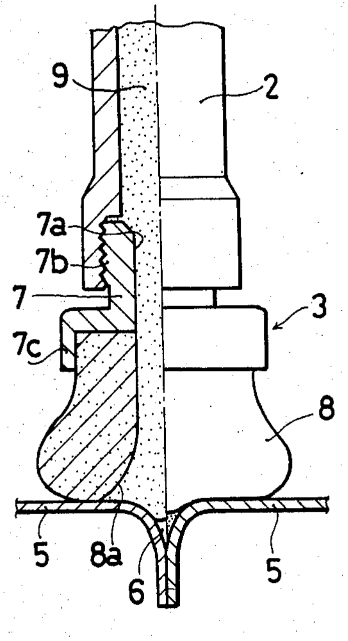
FIGS. 4 and 5 are similar side views showing modified examples thereof.
Figure 5:
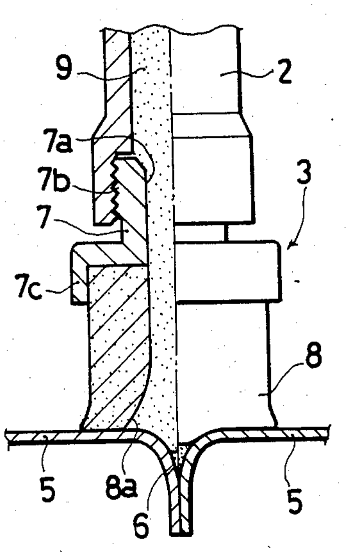

Further, in the embodying example shown in FIG. 3, the nozzle body 8 is formed as a tubular brush. However, instead thereof, the tubular nozzle body 8 may be formed of a solid body of flexible material such as polyurethane foam as shown in FIG. 4 or a solid body of silicone rubber as shown in FIG. 5.

In the case of the tubular nozzle body being made as a brush, the brush made of nylon hair is more advantageous than that made of natural hair such as pig hair in that the nylon is higher in durability and can apply the sealing agent with a better appearance.

In the illustrated examples, a nozzle opening **8*a* defined by an inner circumferential side surface of a forward end portion of the nozzle body 8 is made gradually wider towards the forward end thereof. This causes such advantages that the deliverying stability of the sealing agent can be improved and also it becomes possible to heap up the sealing agent in the portion 6** of the joint.

Next, the operation of this invention will be explained as follows:

The nozzle 3 attached to the sealing gun 2 is brought into contact, at the forward end of the nozzle body 8 with the joint 6 of the panels 5, 5 constituting the portion 6 to be sealed. While in contact, the gun 2 is supplied with the sealing agent 9 from a pressure supply circuit (not illustrated). In the meanwhile, the nozzle 3 is moved along on the portion 6 to be sealed in accordance with a locus of a program previously memorized by the industrial robot, whereby the sealing agent 9 delivered from the nozzle opening 8a of the nozzle body 8 is applied to the portion 6 to be sealed, as clearly shown in the left half portions of FIGS. 3-5.

As used hereinafter, "normal operation" means operation as a sealing apparatus, applying and spreading a filling and sealing agent into a joint.

Even if, at this stage, the nozzle 3 deviates to a certain extent from the portion 6 to be sealed, in respect of the deviation in two dimensions, the sealing agent 9 can be spread to cover the whole area of the forward end surface of the opening 8a of the nozzle body 8, owing to the fact that the nozzle body 8 is flexible. Thus, an allowable extent of deviation of the nozzle body 8 from the portion 6 is as far as about a half of the outer diameter D of the nozzle body 8. In respect of also the deviation thereof in three dimensions, deviations can be allowed also owing to the flexibility of the nozzle body 8. Thus, a good applying of the sealing agent 9 to the portion 6 to be sealed can be achieved, despite such deviations. At the same time, at the rear part in the advancing direction of the nozzle body 8, the sealing agent 9 previously applied to the portion 6 is pushed to be filled into the portion 6, as clearly shown in the right half portions of FIGS. 3-5. Thus, even if there is caused a deviation of the nozzle 3 from the portion 6 to be sealed, the application of the sealing agent 9 to the portion 8 and filling the same therein can be carried out simultaneously, and a good sealing can be obtained by a single step. In addition, even if during the sealing operation, there is the movement of the arm of the industrial robot 1 is obstructd by the motorcar body and consequently the nozzle 3 cannot be kept in contact with the portion 6 to be sealed at right angles thereto, and even if the applying angle of the nozzle 3 on the portion 6 to be sealed is not at 90 degres but at about 70 degrees, a good sealing can be achieved owing to the fact that the nozzle body 8 is made of the flexible material.

Next, more concrete embodying experiment examples of this invention will be explained together with various use conditions thereof, as follows:

EMBODYING EXPERIMENT EXAMPLE 1

Figure 9:
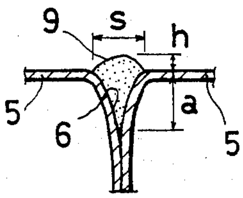
FIG. 9 is a sectional view of a portion to be sealed for showing a sealed condition thereof.

The sealing apparatus of this invention as shown in FIG. 3 is so arranged that the outer diameter D of the tubular brush constituting the nozzle body 8 is 8 mm, the delivery pressure of the sealing agent 9 is 120 kg/cm$^2$, the contact angle of the nozzle 3 in relation to the portion 6 to be sealed is 70 degrees, and the travelling speed of the nozzle 3 is 8 m/min. The sealing apparatus thus arranged is used for sealing the joint between the panels 5, 5 constituting the rear wheel housing 4 of the motorcar body set in position and stopped. As a result, there can be obtained such a good sealing that the filling depth a of the sealing agent into the joint is 7 mm, and the heap-up height h is 2 mm as shown in FIG. 9. In the same Figure, S denotes the applied width of the sealing agent.

Next, this invention example and the conventional example with its nozzle having no flexibility are, respectivelty, used for sealing the joint between the panels 5, 5 constituting the foregoing rear wheel housing 4, under various conditions as shown in the following Table 1, for comparing the two in sealing property.

TABLE 1

| Nozzle shape | Nozzle opening diameter (mm) | Delivery pressure (kg/cm$^2$) | Nozzle contact angle (degree) | Nozzle travel-ing speed (m/min.) | a (mm) | h (mm) |
|---|---|---|---|---|---|---|
| With brush D = 8 mm | 2 | 80 | 70 | 8.0 | 6 | 1.5-2 |
| | | 100 | 70 | 8.0 | 8 | 1.5-2 |
| | | 120 | 70 | 8.0 | 7 | 2-2.5 |
| | | 140 | 70 | 8.0 | 9 | 2.5-3 |
| | | 160 | 70 | 8.0 | 10 | 2.5-3 |
| Rounded forward end metallic nozzle | 2 | 80 | 70 | 8.0 | 3 | 2-2.5 |
| | | 100 | 70 | 8.0 | 2 | 2-2.5 |
| | | 120 | 70 | 8.0 | 3 | 2.5-3 |
| | | 140 | 70 | 8.0 | 4 | 3-3.5 |
| | | 160 | 70 | 8.0 | 4 | 3.5-4 |
| With brush D = 15 mm | 4 | 80 | 70 | 15.0 | 7 | 2-3 |
| | | 100 | 70 | 15.0 | 8 | 2-3 |
| | | 120 | 80 | 15.0 | 8 | 3 |
| | | 140 | 70 | 15.0 | 9 | 3-3.5 |
| | | 160 | 70 | 15.0 | 10 | 3-3.5 |
| Rounded forward end metallic Nozzle | 4 | 80 | 70 | 15.0 | 3 | 2-3 |
| | | 100 | 70 | 15.0 | 3 | 2-3 |
| | | 120 | 70 | 15.0 | 4 | 3-2.5 |
| | | 140 | 70 | 15.0 | 4 | 3.5-4 |
| | | 160 | 70 | 15.0 | 4 | 3.5-4 |

As will be clear from the Table 1, there can be obtained in the cases of this invention example a filling depth a which is about double or more as compared with that in the cases of the conventional example. Thus it has been found that this invention example is excellent in sealing property.

EMBODYING EXPERIMENT EXAMPLE 2

This invention example and the conventional example with its nozzle having no flexibility are, respectively, used for sealing the joint between the panels 5, 5 constituting the rear wheel housing, similarly to the above Example 1, under various conditions as shown in the following Table 2, for comparing the two in respect of the relationship between the nozzle travelling speed and the sealing property.

TABLE 2

| Nozzle Shape | Nozzle opening diameter (mm) | Delivery pressure ($kg/cm^2$) | Nozzle contact angle (degree) | Nozzle travel-ling speed (m/min.) | S (mm) | Allowable width (mm) |
|---|---|---|---|---|---|---|
| With | 2 | 80 | 70 | 8 | 8 | ±4 |
| brush | | 80 | 70 | 12 | 8 | ±4 |
| D − 8 mm | | 80 | 70 | 16 | 8 | ±4 |
| | | 80 | 70 | 20 | 8 | ±4 |
| | | 80 | 70 | 24 | 7.5 | ±3.7 |
| Rounded | 2 | 80 | 70 | 8 | 6 | ±3 |
| forward | | 80 | 70 | 12 | 5 | ±2.5 |
| end | | 80 | 70 | 16 | 5 | ±2.5 |
| metallic | | 80 | 70 | 20 | 3 | ±1.5 |
| nozzle | | 80 | 70 | 24 | 2.3 | ±1.2 |
| With | 4 | 80 | 70 | 8 | 14 | ±7.5 |
| brush | | 80 | 70 | 12 | 15 | ±7.5 |
| D = 15 mm | | 80 | 70 | 16 | 15 | ±7.5 |
| | | 80 | 70 | 20 | 13 | ±6.5 |
| | | 80 | 70 | 24 | 12 | ±6 |
| Rounded | 4 | 80 | 70 | 8 | 8 | ±4 |
| forward | | 80 | 70 | 12 | 7.5 | ±3.7 |
| end | | 80 | 70 | 16 | 7 | ±3.5 |
| metallic | | 80 | 70 | 20 | 7 | ±3.5 |
| nozzle | | 80 | 70 | 24 | 6 | ±3 |

As will be clear from the above Table 2, in the case of the conventional rounded forward end metallic nozzle type one, the applied with S is comparatively small, and the allowable width for allowing the deviation from the joint is small. In addition, the applied width S is decreased according as the nozzle travelling speed is increased, and thus the sealing operation at a high speed becomes difficult.

On the contrary, in the case of this invention example, the applied width S is large, and the allowable width is also large. The decrease in the applied width S is small to obtain a stable sealing width even when the nozzle travelling speed is increased, and thus this invention example is excellent in sealing property.

In the foregoing embodying examples of this invention, it often happens that, on such an occasion that the surface of the workpiece is rough or that the nozzle is changed in its travelling direction, for instance, the front part in the advancing direction of the nozzle body 8 is largely collapsed to be inclined rearwards due to friction force acting thereon or a pressure contact thereof with the workpiece and thereby the delivery of the sealing agent 9 is restrained, and thereafter when that collapsed part is restored to the original state, a large amount of the sealing agent is delivered momentarily. Thus, there is liable to be a dispersion in delivery or applied amount of the sealing agent onto the portion 6 to be sealed.

Figure 6:
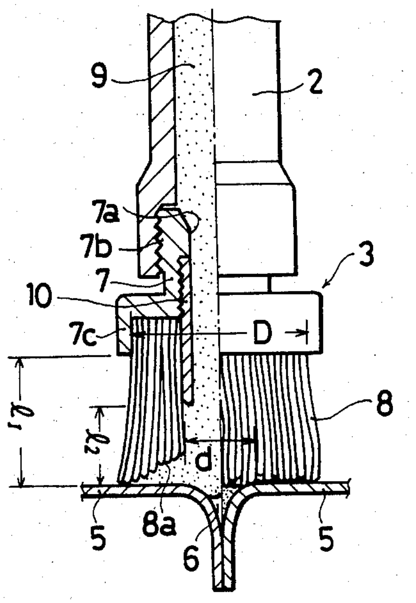
FIG. 6 is a half-sectional side view, of an important portion of another embodiment of this invention having a reinforcement pipe.
Figure 7:
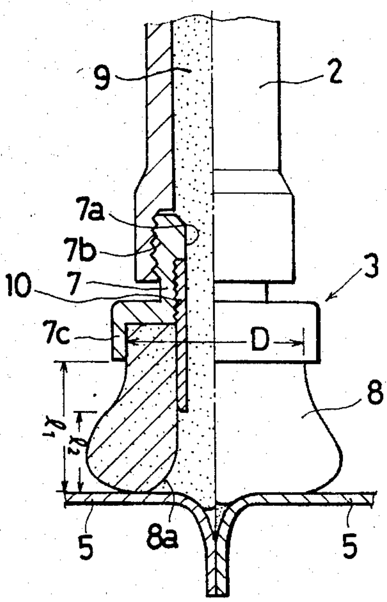
FIGS. 7 and 8 are similar side views of modified examples thereof.
Figure 8:
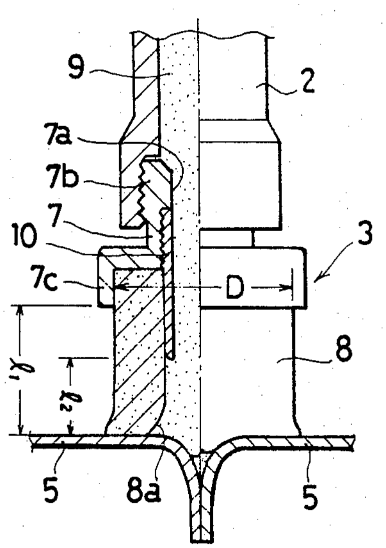

For preventing this defect, in the illustrated embodying examples shown in FIGS. 6–8, a reinforcement pipe 10 protruding from the nozzle holder 7 is fitly mounted in the nozzle body 8, so that the front part in the advancing direction of the nozzled body 8 may be supported by the pipe 10 and thereby the rearward inclinec collapse can be prevented. Consequently, the sealing agent 9 can be applied uniformly to the portion 6.

In this case, if the length of the pipe 10 is too short, the function thereof for preventing the collapse of the nozzle body 8 is so lowered that there is liable to be caused the inequal delivery of applied amount of the sealing agent. If on the other hand, the length of the pipe 10 is too large, such a significance is lost that the nozzle body 8 is made of the flexible material, and the filling property of the sealing agent 9 is lowered.

Various tests were carried out in respect of the relationship between the sealing property and the ratio $l_2/l_1$, that is, the ratio of the length $l_2$ measured from the forward end of the reinforcement pipe 10 to the forward end of the nozzle body 8 to the protruded length $l_1$ of the nozzle body 8 for the nozzle holder 7 to obtain the results as shown in the following Table 3.

Each of these tests is carried out under the conditions that the nozzle body 8 is formed of a nylon brush which is 15 mm in outer diameter D, 4 mm in inner diameter and 15 mm in protruded length $l_1$, and the delivery pressure of the sealing agent is 80 $kg/cm^2$ and the nozzle travelling speed is 15 m/min.

TABLE 3

| $l_2/l_1$ | Filling property | Dispersion in applied amount of sealed portion (in 10 meters) |
|---|---|---|
| 1.0 | O | 25–35% |
| 0.9 | O | 15–20% |
| 0.85 | O | 11–15% |
| 0.8 | O | 2–5% |
| 0.7 | O | 2–5% |
| 0.6 | O | 2–5% |
| 0.5 | O | 2–5% |
| 0.4 | O | 2–5% |
| 0.3 | O | 2–5% |
| 0.2 | x | |
| 0.1 | x | |
| 0 | x | |

(O indicates the filling depth a is 5 mm or more, x indicates the filling depth is 5 mm or less)

The filling property: the mark when the filling depth a is 5 mm or more, the mark x when the same is 5 mm or less.

As will be clear from the above Table 3, if the length of the reinforcement pipe 10 is so set that the ratio $l_2/l_1$ is 0.3–0.8, the filling property is good and the dispersion in applied amount is small.

Thus, according to this invention, the nozzle body is made of the flexible material, so that a good sealing can be a certain extent between the nozzle and the portion to be sealed, even if the nozzle travelling speed is large, or even if the contact angle of the nozzle is not at right angles to the portion to be sealed. In addition, there is no fear that the surface of the workpiece is injured by the nozzle. Additionally, the step can be carried out simultaneously and the workability becomes excellent.

What is claimed is:

1. A sealing apparatus for applying and spreading a filling and sealing agent into a joint, said apparatus comprising an industrial robot having a sealing gun with a nozzle provided on a forward end portion of the sealing gun which may be moved along a joint to be filled and sealed with a filling and sealing agent dispensed from said gun through said nozzle in accordance with a locus of a program previously programmed to the robot, characterized in that the nozzle includes a nozzle holder having a base portion fixed to the forward end of said sealing gun and a nozzle body extending forward from said base and through which said filling and sealing agent is dispensed to the joint to be filled and by which said dispensed agent is spread, said nozzle body being of a flexible material connected to the nozzle holder and having a passage extending therethrough for dispensing said filling and sealing agent, said nozzle having an opening defined by an inner circumferential surface of a forward end portion of said nozzle body gradually widening towards the forward end thereof and a reinforcement pipe extending from said nozzle holder mounted in said nozzle body, the ratio of the length from the forward end of the reinforcement pipe to the forward end of the nozzle body to the length from the forward end of the nozzle holder to the forward end of the nozzle body being 0.3–0.8 said nozzle being free from rotary means for rotating said nozzle body during normal operation.

2. A sealing apparatus as claimed in claim 1, wherein the nozzle body is a tubular brush.

3. A sealing apparatus as claimed in claim 2, wherein the brush is made of nylon.

4. A sealing apparatus as claimed in claim 1, wherein the nozzle body is a solid body of polyurethane foam.

5. A sealing apparatus as claimed in claim 1, wherein the nozzle body is a solid body of silicone rubber.

* * * * *